United States Patent
Hoffman et al.

(10) Patent No.: US 9,612,436 B1
(45) Date of Patent: Apr. 4, 2017

(54) HIGH-SPEED SCANNER-TRACKER

(71) Applicant: Ball Aerospace & Technologies Corp., Boulder, CO (US)

(72) Inventors: Charles N. Hoffman, Boulder, CO (US); Christopher M. Leone, Boulder, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 14/824,591

(22) Filed: Aug. 12, 2015

Related U.S. Application Data

(60) Provisional application No. 62/036,206, filed on Aug. 12, 2014.

(51) Int. Cl.
*G02B 26/08* (2006.01)
*G02B 26/10* (2006.01)

(52) U.S. Cl.
CPC ......... *G02B 26/105* (2013.01); *G02B 26/085* (2013.01)

(58) Field of Classification Search
CPC .. G02B 26/085; G02B 26/101; G02B 26/105; G02B 26/10; G02B 7/1821; G02B 26/0816; G02B 26/122
USPC ......... 359/198.1, 199.1, 199.3, 200.1, 221.2, 359/226.1–226.2
See application file for complete search history.

(56) References Cited

U.S. PATENT DOCUMENTS

| | | | |
|---|---|---|---|
| 6,706,999 B1 | 3/2004 | Barrett et al. | |
| 6,735,004 B1 | 5/2004 | Hagelin et al. | |
| 6,816,294 B2 | 11/2004 | Unrath et al. | |
| 6,856,437 B2 | 2/2005 | Witt et al. | |
| 6,862,122 B1 | 3/2005 | Moore | |
| 7,380,950 B1 | 6/2008 | Lorell et al. | |
| 7,576,837 B2 | 8/2009 | Liu et al. | |
| 7,648,249 B2 | 1/2010 | Cook | |
| 7,889,416 B1 | 2/2011 | Stowe | |
| 8,077,294 B1 | 12/2011 | Grund et al. | |
| 8,213,803 B2 | 7/2012 | Wu et al. | |
| 8,306,273 B1 | 11/2012 | Gravseth et al. | |
| 8,322,870 B2 | 12/2012 | Miller | |
| 8,593,712 B2 | 11/2013 | Eto et al. | |
| 8,692,151 B2 | 4/2014 | Tertitski et al. | |
| 8,744,126 B1 | 6/2014 | Rohrschneider | |
| 8,958,057 B2 | 2/2015 | Kane et al. | |
| 2011/0019176 A1* | 1/2011 | Kim | G01C 3/08 356/5.01 |

\* cited by examiner

*Primary Examiner* — James Phan
(74) *Attorney, Agent, or Firm* — Sheridan Ross P.C.

(57) ABSTRACT

Methods and systems for providing a high speed scanner tracker are disclosed. The scanner tracker can include a mirror assembly that rotates within a housing about a first axis. Moreover, the mirror can be tilted about a second axis. Pulses of light can be directed to and received from a selected location or target surface located within a target volume by selectively controlling the rotational and tilt angles of the mirror relative to a laser associated with the scanner tracker assembly.

9 Claims, 11 Drawing Sheets

HIGH-SPEED SCANNER-TRACKER

CROSS-REFERENCE TO RELATED APPLICATIONS

This application claims priority to U.S. Provisional Patent Application Ser. No. 62/036,206, filed Aug. 12, 2014, the entire disclosure of which is hereby incorporated herein by reference.

FIELD

High-speed scanner-tracker systems and methods are provided.

BACKGROUND

Fast steering mirrors are used in various applications. For example, fast steering mirrors can be used in connection with LIDAR (light detection and ranging) or LADAR (laser detection and ranging) systems. In particular, a fast steering mirror can be used to point a laser beam at a desired target. In addition, the fast steering mirror can be used to collect laser light reflected from the surface of the target. The light can then be received at a detector, and range information can be determined from the time of flight of the light. LIDAR and LADAR systems have a wide range of applications, including but not limited to three-dimensional mapping, aircraft landing, space craft docking, underwater survey, autonomous vehicle navigation, and terrain relative navigation. Steering mirrors can also be used in connection with laser communication systems, machine reading systems, tracking systems, and the like.

It is often desirable to scan a laser beam. For example, a laser beam can be scanned in a grid-like pattern in order to acquire a target or to produce a map or image of a three-dimensional target surface. However, scanning a laser beam over a surface can be a relatively slow process, due to the limitations of conventional fast steering mirrors. This is particularly true where the optical system design requires a mirror with a relatively large reflecting surface. In addition, many applications require a mirror that can be precisely controlled. Moreover, accurate information regarding the pose of the mirror relative to the laser, in order to accurately determine the location of a point or area on a surface from which a return signal is reflected in three-dimensional space, is often critical to the operation of the system incorporating the fast steering mirror.

SUMMARY

Embodiments of the present disclosure provide high-speed scanner-tracker systems and methods. The systems include scanner assembly having a base and a rotating assembly that is connected to the base by a bearing assembly. In particular, the bearing assembly allows the rotating assembly to rotate relative to the base about a first axis. The rotating assembly includes a rotor and a mirror that is connected to the rotor by a pivot. The pivot allows the mirror to tilt relative to the rotor and the base about a second axis. The rotation of the rotating assembly relative to the base can be controlled by a rotational motor assembly. The tilt of the mirror relative to the rotor in the base can be controlled by a tilt motor assembly.

In accordance with further embodiments of the present disclosure, the tilt motor assembly includes a coil mounted to the base. More particularly, the coil is located proximate to a circumference of the mirror. The tilt motor assembly additionally includes at least a first magnet on a first side of the tilt axis, and a second magnet on a second side of the tilt axis. The first magnet is arranged such that its poles are aligned along a first direction, and the second magnet is arranged such that its poles are aligned in an opposing or opposite direction. Moreover, the magnets are located proximate to the outer circumference of the mirror. Accordingly, by passing a current through the coil in a first direction, opposite sides of the mirror can be moved in opposite directions, thereby tilting the mirror in a first direction about the second axis. Conversely, by passing a current through the coil in a second direction, the mirror can be tilted in a second direction about the second axis.

Methods in accordance with embodiments of the present disclosure include rotating an assembly including a mirror relative to a base. At least some of the methods include providing electrical current to the coil of a rotational motor assembly to establish and control the rotation of the rotating assembly. The method additionally includes tilting the mirror. At least some of the methods include providing an electrical current to a coil disposed adjacent to a circumference of the mirror, thereby applying a force in a first direction to a magnet mounted to the mirror on a first side of a tilt axis, and to apply a force in a second direction to a magnet mounted to the mirror on a second side of the tilt axis. The first and second directions are generally opposed to one another, causing the mirror to rotate about the tilt axis.

In various applications a scanner assembly as disclosed herein can be incorporated into a LADAR or LIDAR system. As can be appreciated by one of skill in the art, LADAR and LIDAR systems are essentially equivalent to one another in that both use a pulsed light source to produce light that is reflected from a target to obtain range information. The term LADAR is commonly used in connection with systems having defense applications, while the term LIDAR is commonly used in connection with non-military applications. However, in the present description, no distinction between the terms is made. Therefore, for ease of description and consistency, the term LADAR is used throughout this description. However, it should be understood that the term LADAR is also intended to encompass LIDAR, to the extent that a distinction between the meaning of the terms might otherwise be drawn. In addition, although various portions of the description and included examples discuss the use of scanner assemblies in accordance with embodiments of the present invention as being incorporated into a LADAR system, embodiments of the present disclosure are not limited to such applications.

Additional features and advantages of embodiments of the present disclosure will become more readily apparent from the following description, particularly when taken together with the accompanying drawings.

DETAILED DESCRIPTION

Figure 1:
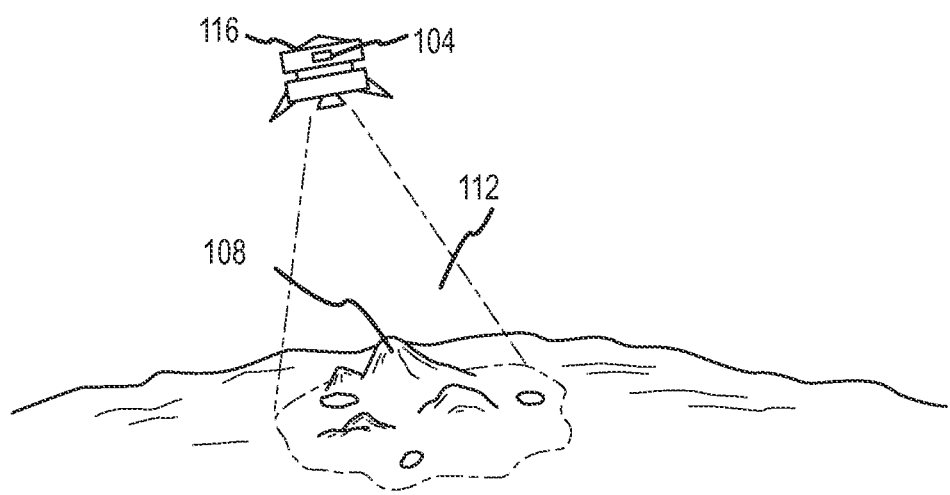
FIG. 1 depicts an example scenario in which a scanning LADAR system can be used to obtain three-dimensional data from a target volume.

FIG. 1 depicts a scenario in which a LADAR system incorporating a scanner system in accordance with embodiments of the present disclosure can be used. The LADAR system 104 in this example is being used to obtain information regarding an underlying or target surface 108 within a target volume 112. More particularly, in this example the LADAR system 104 is mounted to a moving vehicle 116, and is being used in connection with identifying a safe landing zone for the vehicle 116. However, as can be appreciated by one of skill in the art after consideration of the present disclosure, a LADAR system 104 incorporating a scanner system in accordance with embodiments of the present disclosure can be used in various other scenarios, such as, but not limited to, mapping solid surfaces within target volumes, docking operations, collision avoidance systems, communications systems and the like. Moreover, a scanner system as disclosed herein can be associated with any type of vehicle or stationary platform.

Figure 2:
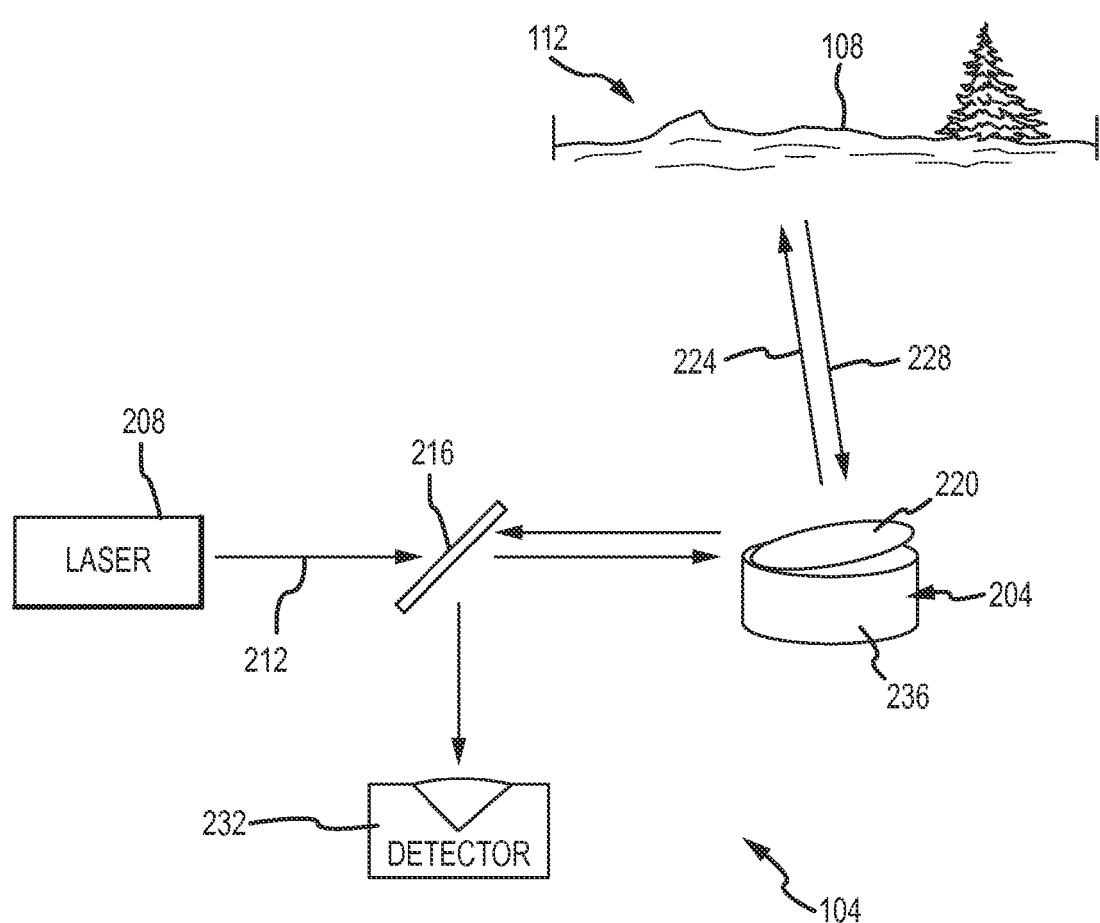
FIG. 2 is a schematic depiction of components of a scanning LADAR system incorporating a scanner assembly in accordance with embodiments of the present disclosure.

FIG. 2 is a schematic depiction of a scanning LADAR system 104 incorporating a scanner assembly or high-speed scanner-tracker 204 in accordance with embodiments of the present disclosure. The LADAR system 104 generally includes a laser 208 that can be operated to provide a pulsed beam of light or laser beam 212 having a selected length at a selected time. As depicted, the pulsed beam 212 can be passed through a beam splitter 216, such that the beam is incident on a mirror 220 of the scanner assembly 204. The mirror 220 reflects the incident laser beam 212 as a directed beam 224 towards a volume of interest or target volume 112. The surface 108 of the target volume 112 reflects at least some of the light included in the directed beam 224 to the mirror 220 as reflected or return light 228. The reflected light 228 is then reflected by the mirror 220 to the beam splitter 216, which directs the reflected light 228 to a detector 232. As an example, but without limitation, the detector 232 can be a single pixel or element detector, or a multiple pixel or element detector.

As can be appreciated by one of skill in the art after consideration of the present disclosure, range information can be obtained from the time of flight of the light between the target surface 108 and the LADAR system 104. That range information, together with information regarding the tilt and rotational angle of the mirror 220 relative to the incident laser beam 212, can be used to locate a point on the target surface 108 relative to the LADAR system 104. Information regarding the range to different locations on the target surface 108 within the target volume 112 can thus be obtained by varying the angle of the mirror 220 relative to the incident laser beam 212. As will be described in greater detail elsewhere herein, the tilt angle of the mirror 220 relative to the incident laser beam 212 can be varied by varying the tilt angle of the mirror 220 relative to the base or housing 236 of the scanner assembly 204, while the rotational angle of the tilted mirror 220 relative to the incident laser beam 212 can be varied by changing the rotational position of the mirror within the housing 236.

Figure 3:
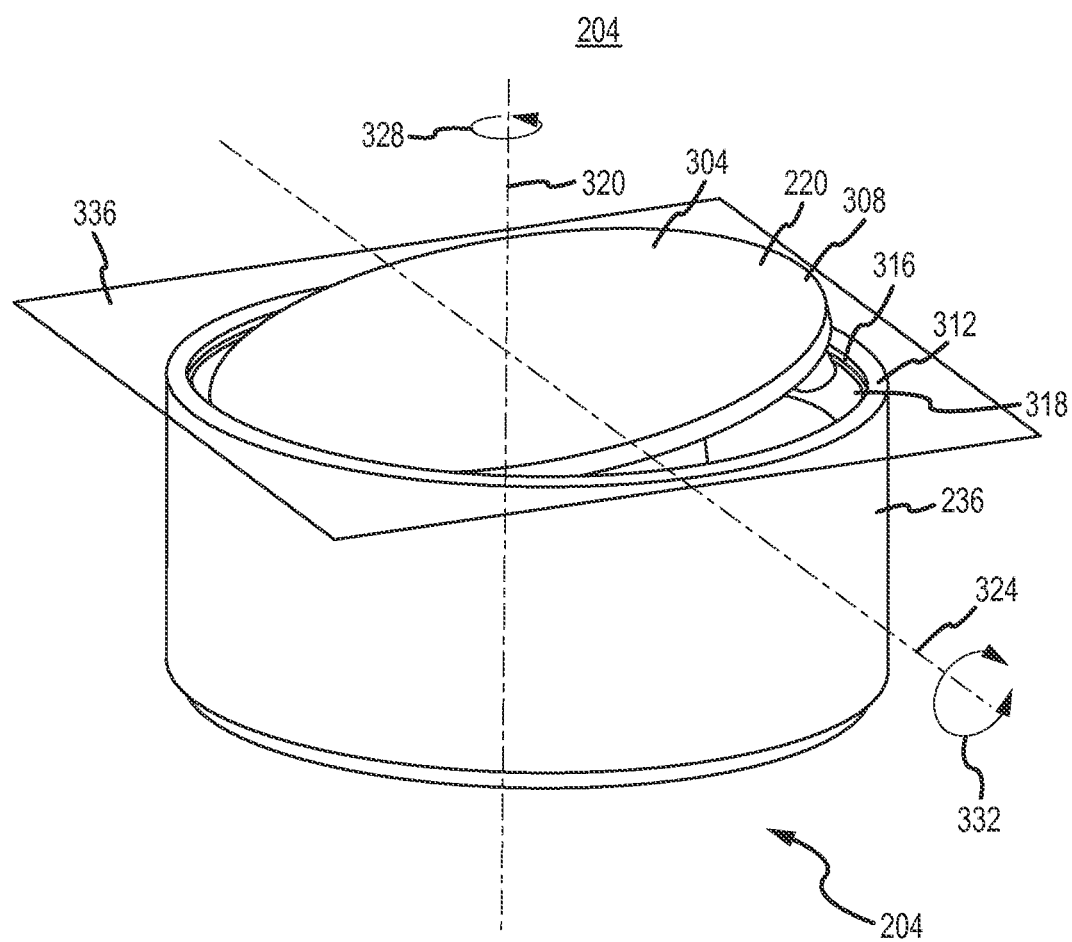
FIG. 3 is a perspective view of a scanner assembly in accordance with embodiments of the present disclosure.

FIG. 3 depicts an exemplary scanner assembly 204 in accordance with embodiments of the present disclosure in a perspective view. As shown, the mirror 220 can be provided as an element having a planar reflecting surface 304, and a circular outer perimeter 308. The housing 236 can include a sidewall 312 that defines a circular aperture 316 with a diameter that is slightly larger than the diameter of the outer perimeter or circumference 308 of the mirror 220. In accordance with further embodiments of the present disclosure, and as discussed in greater detail elsewhere herein, a coil or winding 318 can be located within the circular aperture 316, between the sidewall 312 and the outer perimeter 308 of the mirror 220.

In addition, FIG. 3 depicts the two axes about which the mirror 220 can be moved. A first axis 320 generally extends through a center point of the mirror 220. The first axis 320, also referred to herein as the rotational axis or axis of rotation, is an axis about which the mirror 220 rotates within the circular aperture 316 of the housing 236. A second axis 324 generally extends along a line that is parallel to the plane of the reflecting surface 304 of the mirror 220. The second axis 324, also referred to herein as the tilt axis, is an axis about which the mirror 220 can be tilted relative to a reference plane 336 that is perpendicular to the first axis 320. As depicted by the arrow 328, the mirror 220 is generally rotated in one direction relative to the housing 236. However, it should be appreciated that the direction of rotation can be opposite the one depicted by the arrow 328. Moreover, in accordance with at least some embodiments, the direction of rotation about the first axis 320 can be reversed during operation of the scanner assembly 204. As depicted by the arrow 332 associated with the second axis 324, the mirror 220 can be tilted in first and second directions about the second axis 324.

Figure 4A:
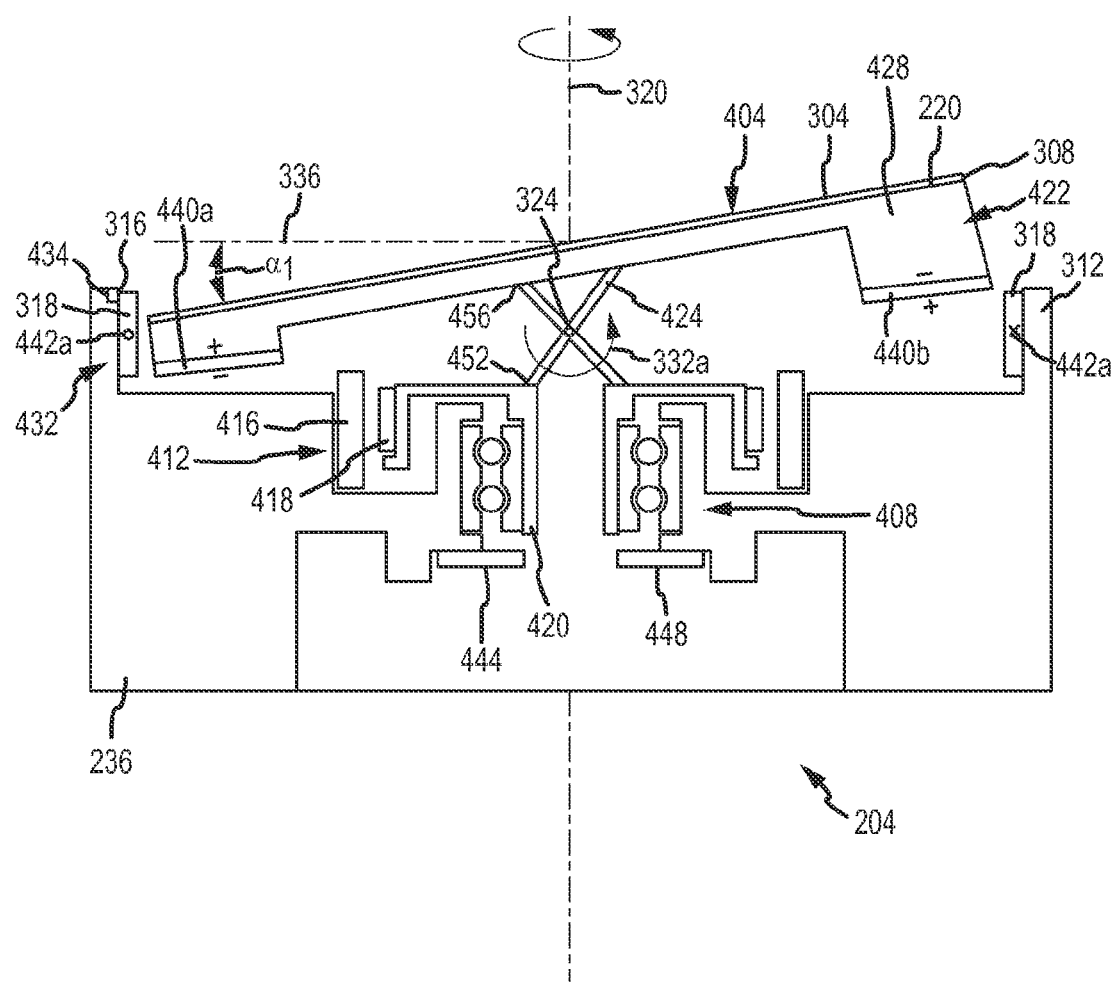
FIG. 4A is a cross section in elevation of a scanner assembly in accordance with embodiments of the present disclosure, with the mirror at a first tilt angle.
Figure 4B:
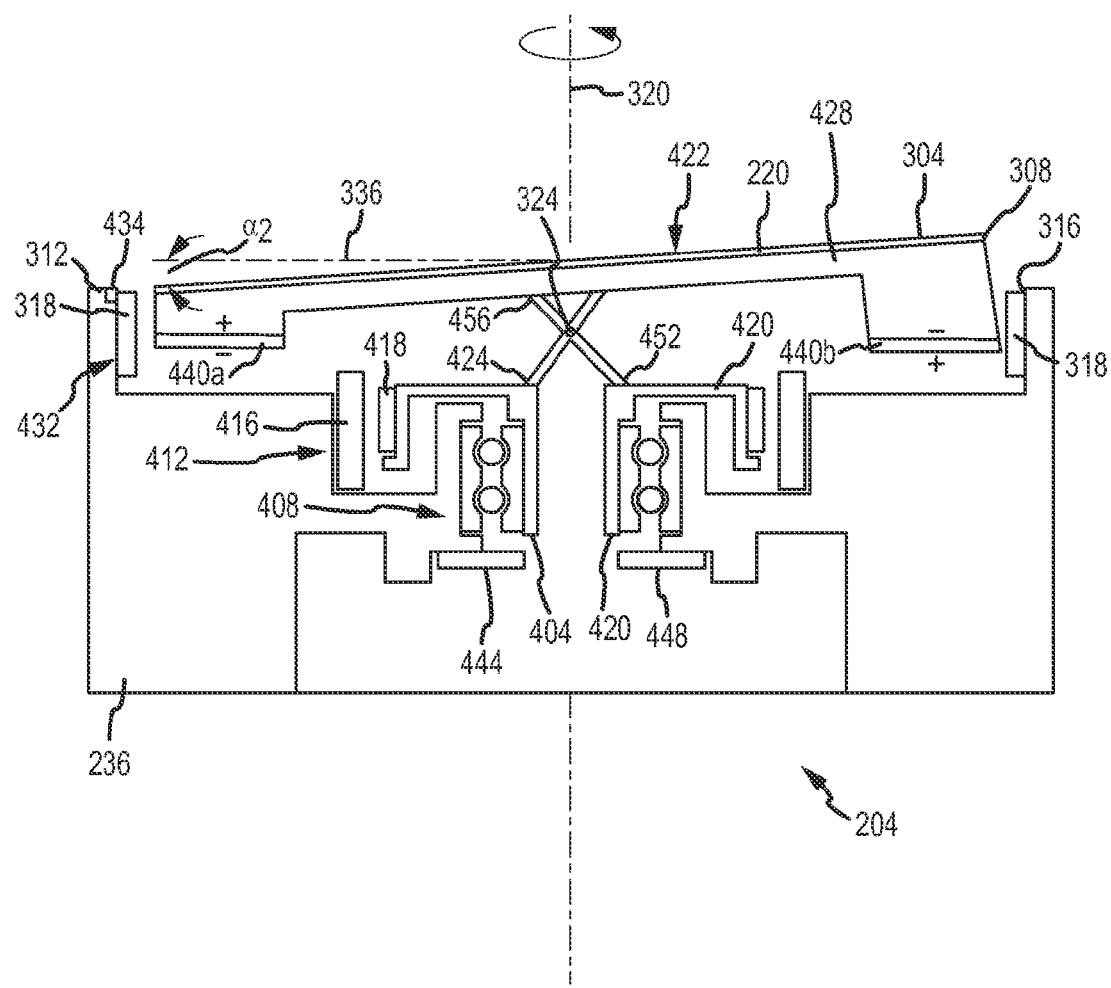
FIG. 4B is a cross section in elevation of a scanner assembly in accordance with embodiments of the present disclosure, with the mirror at a second tilt angle.
Figure 4C:
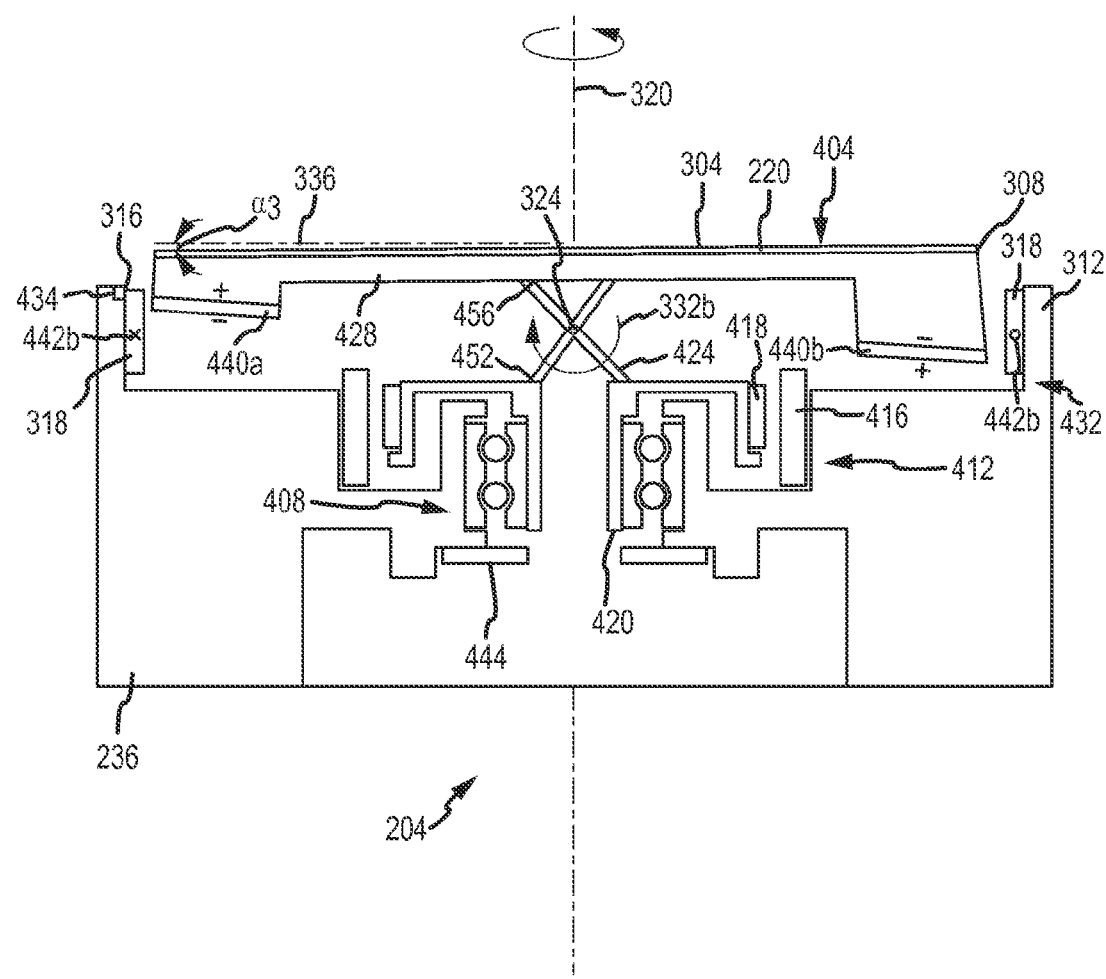
FIG. 4C is a cross section in elevation of a scanner assembly in accordance with embodiments of the present disclosure, with the mirror at a third tilt angle.
Figure 5:
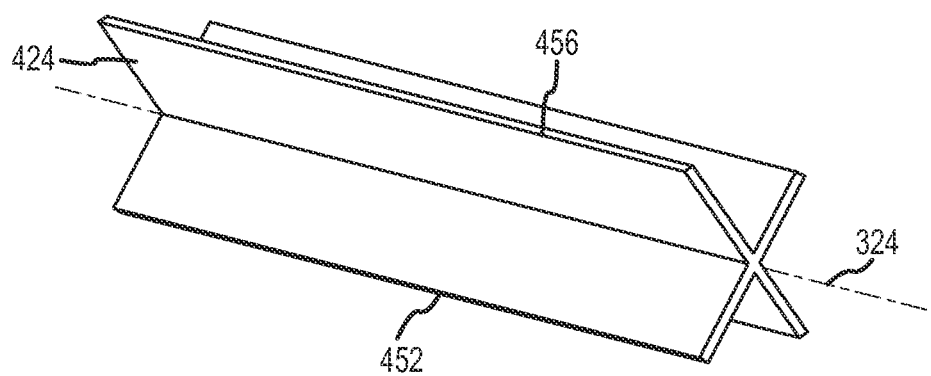
FIG. 5 is a perspective view of a pivot in accordance with embodiments of the present disclosure.

FIGS. 4A-4C depict the exemplary scanner assembly 204 of FIG. 3 in cross-section. FIGS. 4A-4C differ from one another in that they each illustrate a different tilt angle of the mirror 220. In particular, FIG. 4A depicts the mirror reflecting surface 304 tilted about the second axis 324 by a first amount such that the reflecting surface 304 is at a first angle $\alpha_1$ with respect to the reference plane 336. FIG. 4B depicts the mirror reflecting surface 304 tilted about the second axis 324 by a second amount such that the reflecting surface 304 is at a second angle $\alpha_2$ with respect to the reference plane 336. FIG. 4C depicts the mirror reflecting surface 304 tilted about the second axis 324 by a third amount such that the reflecting surface 304 is at a third angle $\alpha_3$ with respect to the reference plane 336.

As shown, the mirror 220 is part of a rotating assembly 404 that is connected to the base 236 by a rotational bearing assembly 408. The rotational bearing assembly 408 allows the rotating assembly 404 to rotate about the first axis 320 relative to the base 236. The rotating assembly 404 can be rotated in a controlled manner by a rotational motor 412. The rotational motor 412 can include a set of coils 416 mounted on the housing 236, adjacent magnets 418 provided on the rotating assembly 404 and can include a multiple phase motor. Moreover, the rotational motor 412 can be controlled to rotate the rotating assembly continually about the first axis 320 at a selected rate, or to turn the rotating assembly to a selected angle about the first axis 320 to provide a point and stare capability.

The rotating assembly 404 generally includes a rotor member 420, and a pivot 424 that interconnects the rotor member 420 and the mirror 220. The mirror 220 can be provided as part of a mirror assembly 422 that also includes a mirror substrate or support 428 and magnets 440. In at least some embodiments of the present invention, the mirror substrate 428 has a wedge-shaped profile, as shown in FIGS. 4A-4C. As a result, the reflecting surface 304 of the mirror 220 is "pre-tilted" with respect to the reference plane 336 when the mirror 220 or the mirror substrate 428 is in a neutral or rest state, for example as shown in FIG. 4B.

A tilt motor assembly or tilt activation mechanism 432 is provided to selectively tilt the reflecting surface 304 of the mirror 220 by an additional and/or lesser amount relative to any amount of pre-tilt that exists when the mirror 220 or the mirror substrate 428 is in the neutral or rest state. The tilt motor assembly 432 generally includes a coil 318 (also shown in FIG. 3) mounted to the base 236, and the pair of magnets 440 mounted to the mirror support 428. The coil 318 can extend around the entire circumference of the base 236, within the circular aperture 316 formed by the sidewall 312 of the base 236, adjacent an outer perimeter or circumference 308 of the mirror assembly 422. Moreover, the coil 318 can include a conductor in the form of a toroidal winding, with the ends of the conductor connected to a reversible current source. A first one of the magnets 440$a$ has its polarity arranged along a first direction, while a second one of the magnets 440$b$ has its polarity arranged along a second direction. The first direction is generally opposite the second direction. As a result, in response to a magnetic field created by a flow of electrical current 442$a$ (depicted by • and x in FIG. 4A) through the coil 318, the mirror assembly 422 and thus the mirror reflecting surface 304 is tilted about the second axis 324 in a first direction, depicted by arrow 332$a$. Moreover, as shown in FIG. 4C, in response to a magnetic field created by a flow of electrical current 442$b$ through the coil 318 in an opposite direction, the mirror reflecting surface 304 is rotated about the second axis 324 in a second direction 332$b$. In accordance with other embodiments of the present disclosure, each of the magnets 440$a$ and 440$b$ can include multiple magnet elements.

In accordance with at least some embodiments of the present disclosure, the reflecting surface 304 is at an angle to the reference plane 336 when there is no current in the coil 318, and therefore there is no force applied by the tilt motor assembly 432. That is, the reflecting surface can be "pre-tilted". An example of this configuration is depicted in FIG. 4B. In FIG. 4A, a force is applied by the tilt motor assembly 432 in the first direction 332$a$, causing the angle of the reflecting surface 304 to be increased with respect to the reference plane 336. In FIG. 4C, a force is applied by the tilt motor assembly 432 in the second direction 332$b$, causing the angle of the reflecting surface 304 to be decreased with respect to the reference plane 336. In accordance with embodiments of the present disclosure, the force causing the angle of the reflecting surface 304 to be decreased with respect to the reference plane 336 is applied by passing a current 442$b$ through the coil 318 in a second direction that is opposite the first direction. The tilt angle in the resting condition, with no force applied by the tilt motor assembly 432, can be maintained by the pivot 424. In particular, in order to place the reflecting surface 304 at the first angle cu or any angle between the first $\alpha_1$ and second $\alpha_2$ angles, the pivot 424 is elastically deformed by the force applied by the tilt mechanism 432 so as to tilt the mirror assembly 422 in the first direction 332$a$ about the tilt axis 324. In order to place the reflecting surface 304 at the third angle $\alpha_3$, or any angle between the second angle $\alpha_2$ and the third angle $\alpha_3$, the pivot 424 is elastically deformed by the force applied by the tilt mechanism 432 as the mirror assembly 422 is tilted in the second direction 332$b$ about the tilt axis 324. Moreover, while no current is flowing in the coil 318, and thus while no force is applied by the tilt mechanism 432, the pivot 424 elastically returns the mirror assembly 422 to the neutral position, where the reflecting surface 304 is at the second angle $\alpha_2$ relative to the plane 336 perpendicular to the first axis 320. Accordingly, the pivot 424 can bias the mirror 220 to the second angle. As can be appreciated by one of skill in the art after consideration of the present disclosure, the amount of tilt of the reflecting surface 304 can, for a given force applied by the tilt motor assembly 432, remain constant, even as the rotating assembly 404 is rotated within the base 236 about the first axis 320. A gap detector 434 can be included to provide a signal that indicates the angle of tilt of the reflecting surface 304. As an example, the gap detector can include a differential impedance transducer that uses an eddy current to detect the size of the gap between the transducer and the material (e.g., aluminum) of the mirror substrate 428.

A base 452 of the pivot 424 is connected to the rotor member 420, and a tilting portion 456 of the pivot 424 is interconnected to the mirror 220. For example, as shown in FIGS. 4A-C, the tilting portion 456 of the pivot 424 is connected to a side of the mirror substrate 428 opposite the side of the mirror substrate 428 to which the mirror 220 is connected. In accordance with at least some embodiments of the present disclosure, and as illustrated in FIGS. 4A-C and 5, the pivot 424 may comprise an integral or unitary piece of material having an x-shaped cross section. So configured, the tilt axis 324 will coincide with the center of the x of the pivot 424. As an example, the pivot 424 can be milled from a single, unitary piece of metal. This unitary pivot 424 construction is advantageous, as it eliminates the free play that is inherent in a multiple piece hinge. In addition, the unitary pivot 424 biases the mirror 220 to the neutral position in relation to the plane 336 perpendicular to the first axis 320. In accordance with still other embodiments, the pivot 424 can be integral to other components of the rotating assembly 404, such as the rotor member 420. In such embodiments, the rotor member and the integral pivot 424 can be milled or otherwise formed from a single piece of material. For example, the pivot 424 and the rotor member 420 can be formed from a single piece of titanium.

The tilt angle can be determined by the gap detector 434, or from the magnitude and direction of current being passed through the coil 318. The rotational angle of the rotating assembly 404 relative to the base 236 can be determined from an encoder 444. In at least some embodiments, the encoder 444 includes a photodetector 448 mounted to the base 236, and an encoder pattern on the rotating assembly 404. The path of a directed beam 224 can be determined from the amount of tilt and the rotational position of the reflecting surface 304 relative to the path of the light beam 212 generated by the laser 208 at a time at which a laser pulse 212 is generated by the laser 208. The distance to the point on the target surface 108 on which the directed beam 224 is incident can be determined from the difference between the time at which the pulsed beam 212 was generated, and the time that at which a reflected beam 228 is received. This distance information, in combination with the information regarding the path of the directed beam 224, can be used to precisely locate the point on the target surface 108 in space, relative to the LADAR system 104. Moreover, a three-dimensional map of the target surface 108 can be generated directing additional laser pulses along different paths and receiving the light reflected from each of those additional laser pulses.

Figure 6:
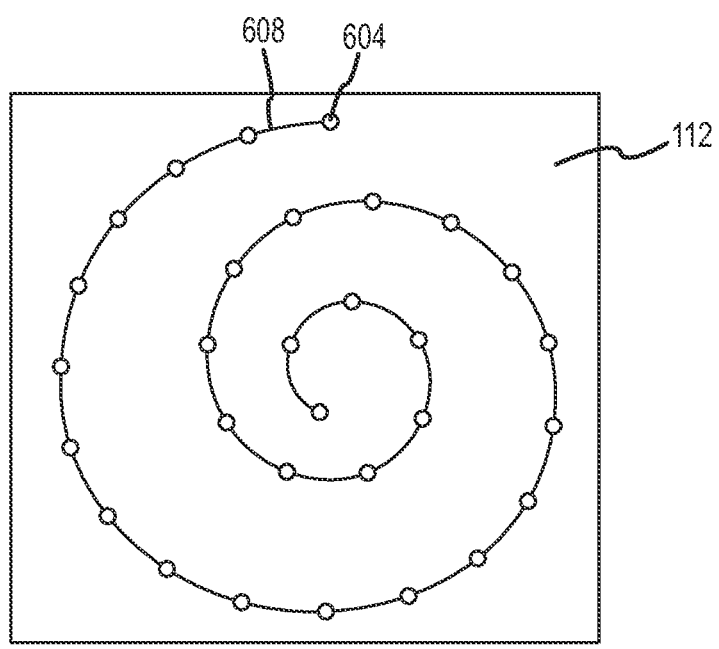
FIG. 6 depicts an example scan pattern in accordance with embodiments of the present disclosure.
Figure 7:
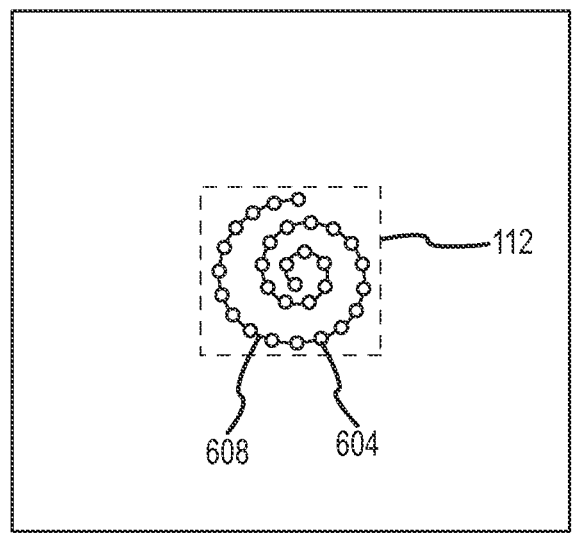
FIG. 7 depicts another example scan pattern in accordance with embodiments of the present disclosure.

Example scan patterns that can be produced by a LADAR system 104 incorporating a scanner assembly 204 in accordance with embodiments of the present invention are depicted in FIGS. 6 and 7. In particular, FIGS. 6 and 7 illustrate spiral type scan patterns performed over a selected period of time. As can be appreciated by one of skill in the art after consideration of the present disclosure, this pattern is the result of varying the tilt of the reflecting surface 304 of the mirror 220 about the tilt axis 324, while continuously rotating the mirror 220 about the rotational axis 320. The dots 604 depict the location of different directed beams 224, while the lines 608 depict where a directed laser pulse would be located within the pattern if one were present. Accordingly, for a given rate of change in the path of the directed light 224 and a given rate of laser pulse generation, a given resolution or density of directed light 224 pulses incident on the target surface 108 will be achieved. In various applications, it is desirable to have a wide scan pattern, such as in a target acquisition phase. FIG. 6 depicts a relatively wide scan angle, encompassing a relatively wide target volume 112. When a relatively narrow area of interest or a particular target has been identified, such as during a target acquisition phase, it can be desirable to narrow the scan to obtain higher resolution. Thus, as shown in FIG. 7, the pattern can be narrowed, increasing the resolution of the scan, but encompassing a relatively narrow target volume 112 for a given time period. In accordance with embodiments of the present disclosure, narrowing the pattern in this way can be achieved by reducing the tilt angle of the reflecting surface 304 relative to the plane 336 perpendicular to the axis of rotation 320 of the rotating assembly 404. From a comparison of the scan patterns in FIGS. 6 and 7, it is apparent that, within the selected period of time, the mirror 220 has in both cases completed 2.5 revolutions, and directed 28 pulses (corresponding to dots 604) within the target volume. However, in FIG. 6, the greater range of tilt angles taken by the reflecting surface 304 in that time period covers a wider target volume 112, at a decreased density of laser pulses as compared to FIG. 7. Accordingly, the change in scan pattern from a relatively wide scan pattern to a relatively narrow scan pattern can be accomplished quickly and easily. Moreover, the configuration of the scanner assembly 204, and in particular the ability to continuously rotate the mirror 220 about the first axis 320 while selectively tilting the mirror 220 about the second axis 324 allows spiral type patterns to be produced very easily, and without requiring abrupt changes in direction or accelerations. This is turn allows the mirror 220 to feature a relatively large reflecting surface 304. In addition to spiral type scan patterns, a scanner assembly 204 in accordance with embodiments of the present disclosure can be operated to produce other scan patterns, or to maintain focus on a single point or location on a target surface 108.

Figure 8:
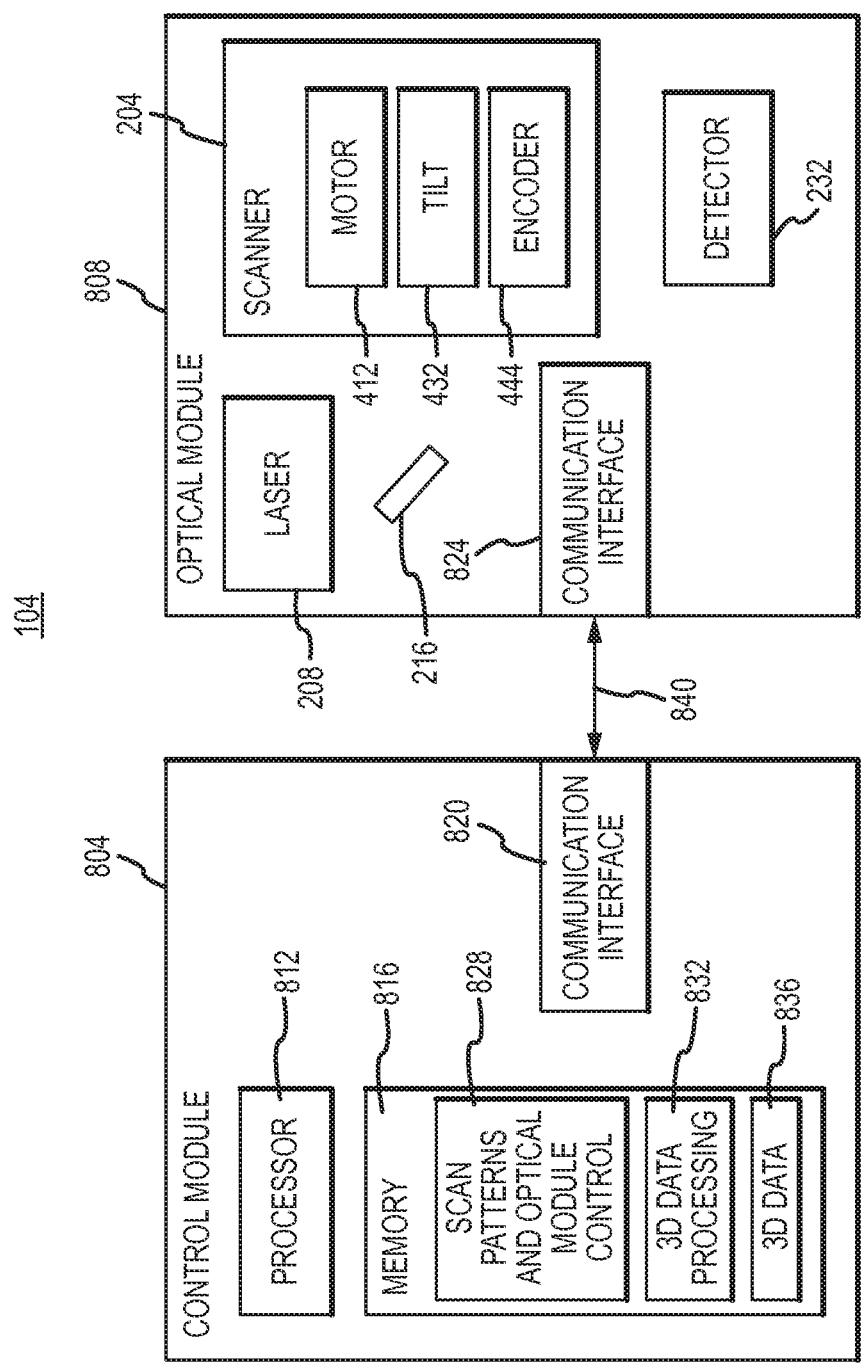
FIG. 8 is a block diagram depicting components of a LADAR system incorporating a scanner assembly in accordance with embodiments of the present disclosure.

FIG. 8 is a block diagram depicting components of a LADAR system 104 in accordance with embodiments of the present disclosure. In general, the LADAR system 104 includes a control module 804 and an optical module 808. The control module 804 can include a processor 812, a memory 816, and a communication interface 820. The optical module 808 can include a communication interface 824, a laser 208, a scanner assembly 204, a beam splitter 216, and a detector 232.

The control module 804 generally operates to control operation of the optical module 808. The control module 804 can itself be operated in response to commands received from an operator or from another device or entity, or can be in response to commands stored in memory 816. The memory 816 can include scan patterns and an optical module control application or set of instructions 828. The memory 816 can also include a three-dimensional data processing application or module 832. In addition, the memory 816 can store three-dimensional data 836 obtained by the optical module 808. Communications between the control module 804 and the optical module 808, or with other devices or entities, can be performed through the communication interfaces 820 and 824, over a wireless or wireline communication link 840.

The optical module 808 receives control instructions from the control module 804 regarding the generation of laser pulses by the laser 208, and the positioning of the mirror 220 relative to the laser 208, through commands controlling the rotational motor assembly 412 and the tilt mechanism 432. In addition, the optical module 808 returns information to the control module 804. Such information can include time of arrival and intensity information obtained by the detector 232 in response to the receipt of reflected light 228. In addition, information regarding the rotational position of the rotating assembly 404 can be provided from the rotational encoder 444, while information regarding the tilt of the mirror surface 304 can be provided from the gap detector 434.

Figure 9:
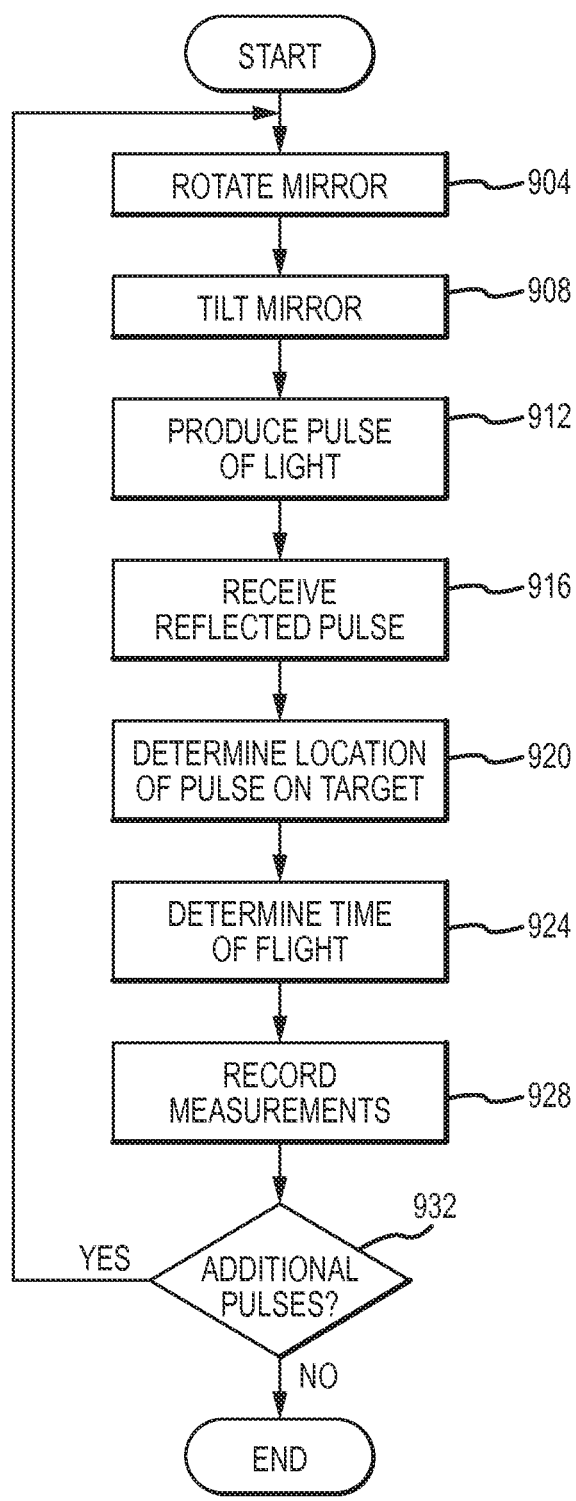
FIG. 9 is a flowchart depicting a method in accordance with embodiments of the present disclosure.

With reference now to FIG. 9, aspects of a method for providing and operating a high speed scanner tracker 204 as disclosed herein are provided. Initially, at step 904, a control signal is provided from a control module 804 to the rotational motor 412 of the scanner assembly 204 to rotate the reflecting surface 304 of the scanner tracker mirror 220 about the first axis 320 at a selected rate. In a typical operating scenario, the mirror 220 is rotated about the first axis 320 continuously, at a constant rate. Alternatively, the rotational motor 412 can be controlled to point a directed beam 224 along a selected angle in azimuth as part of a point and stare operation. At step 908, a signal is sent from the control module 808 to the scanner assembly 204 to control the tilt motor assembly 432 so as to tilt the reflecting surface 304 relative to a plane 336 perpendicular to the first axis of rotation 320 of the rotating assembly 404.

The control module 808 then controls the laser 208 to produce a pulsed beam of light 212 at a selected time (step 912). In accordance with embodiments of the present invention, the time can be selected so as to direct light 212 from the laser 208 to a predetermined location within a target volume 112 as a directed beam 224. Alternatively, the time can be selected so as to evenly space pulses of light in time, or in separation distance, within a target volume 112. Information regarding the pose of the mirror 220 reflecting surface 304 relative to the generated laser beam 212 can be used to determine the predetermined location within the target volume 112 at which the directed beam 224 is directed. In particular, the rotational position of the reflecting surface 304 can be provided by an encoder 444. The tilt angle can be obtained from a gap detector 434.

At step 916, a return pulse 228 is received and is reflected by the scanner assembly 204 to the detector 232, for example via a beam splitter 216. From the pose of the reflecting surface 304 at the time the pulse is generated and at the time the reflected light 228 is received, the location of the directed beam or pulse 224 within the target volume 112 can be determined (step 920). In particular, the direction to the point on the target surface 108 from which the return light 228 was reflected can be determined from the rotational angle and tilt angle of the mirror reflecting surface 304 at the time the pulsed beam of light 212 was provided to the scanner assembly 204. The relative location of the point on the target surface 108 from which the return pulse 228 was reflected is then determined (step 924). The distance of that point on the target surface 108 to the LIDAR system 104 can be determined from the time between the generation of the laser pulse by the laser 208 and the receipt of reflected light by the detector 232. The determined information can then be recorded (step 928). At step 932, a determination can be made as to whether additional measurements of the target surface 108 are to be made. If additional measurements are to be made, the process can return to step 904. Alternatively, for example if a scan of a selected target surface 108 within a target volume 112 is complete, the process can end.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A scanner assembly, comprising:
   a base;
   a bearing assembly;
   a rotating assembly, wherein the rotating assembly is connected to the base by the bearing assembly, and wherein the bearing assembly allows the rotating assembly to rotate about a first axis, the rotating assembly including:
   a rotor;
   a pivot, wherein the pivot includes a base portion fixed to the rotor and a tilting portion;
   a mirror, wherein the mirror is interconnected to the tilting portion of the pivot, and wherein the pivot allows the mirror to be tilted about a second axis.

2. The scanner assembly of claim 1, further comprising:
   a motor, wherein the motor is operable to rotate the rotating assembly about the first axis.

3. The scanner assembly of claim 2, further comprising:
   a tilt activation mechanism, including:
   a first magnet interconnected to the mirror proximate to a first location about a perimeter of the mirror;
   a second magnet interconnected to the mirror proximate to a second location about the perimeter of the mirror;
   a first coil assembly interconnected to the base, wherein the tilt activation mechanism is operable to selectively tilt the mirror about the second axis.

4. The scanner assembly of claim 2, further comprising:
   a mirror substrate, wherein the mirror is interconnected to the mirror substrate, and wherein the mirror substrate has a wedge-shaped profile with a relatively thin first end proximate to the first location about the perimeter of the mirror and a relatively thick second end proximate to the second location about the perimeter of the mirror.

5. The scanner assembly of claim 4, wherein the first magnet is interconnected to the mirror substrate proximate to the relatively thin first end, and wherein the second magnet is interconnected to the mirror substrate proximate to the relatively thick second end.

6. The scanner assembly of claim 5, wherein in an intermediate position about the second axis a reflecting surface of the mirror is tilted by a first amount relative to the first axis.

7. The scanner assembly of claim 4, wherein the tilting portion of the pivot is interconnected to the mirror substrate.

8. The scanner assembly of claim 1, wherein the pivot is formed from a unitary piece of material having an X-shaped cross-section.

9. The scanner assembly of claim 8, wherein the unitary piece of material is metal.

* * * * *